(12) United States Patent
Kurihara et al.

(10) Patent No.: US 6,643,370 B1
(45) Date of Patent: Nov. 4, 2003

(54) COMMUNICATION TERMINAL

(75) Inventors: Takeshi Kurihara, Akiruno (JP); Koichi Ito, Hino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/331,730

(22) PCT Filed: Oct. 26, 1998

(86) PCT No.: PCT/JP98/04838
§ 371 (c)(1),
(2), (4) Date: Jun. 24, 1999

(87) PCT Pub. No.: WO99/22505
PCT Pub. Date: May 6, 1999

(30) Foreign Application Priority Data

Oct. 24, 1997 (JP) ............................................. 9-292503
Jun. 22, 1998 (JP) ............................................. 8-174862

(51) Int. Cl.$^7$ ................................................. H04M 3/00
(52) U.S. Cl. ............................. 379/355.02; 379/355.09; 379/355.1; 379/387.01
(58) Field of Search ........................... 379/88.19–88.21, 379/93.23, 142.01–142.18, 355.01–355.1, 387.01; 455/414–415, 566

(56) References Cited

U.S. PATENT DOCUMENTS 4,924,496 A * 5/1990 Figa et al.
5,267,308 A    11/1993 Jokinen et al.
5,592,546 A *  1/1997 Takahashi

FOREIGN PATENT DOCUMENTS

| JP | 62-130045 | 6/1987 |
| JP | 04-49748 | 2/1992 |
| JP | 04-364645 | 12/1992 |
| JP | 05-48704 | 2/1993 |
| JP | 06-133021 | 5/1994 |
| JP | 406319137 A * | 11/1994 |
| JP | 08-163223 | 6/1996 |

* cited by examiner

Primary Examiner—Duc Nguyen
(74) Attorney, Agent, or Firm—Banner & Witcoff, Ltd.

(57) ABSTRACT

Destination party information related to a call history is stored and destination party information frequently used among destination party information related to the call history is set as erase inhibited, so that a call is placed by displaying the destination party information stored in the memory area on the display section. This memory area is comprised of a ring buffer where the first address and the last address are logically linked, wherein a fixed first destination party information indicating a specific destination party which is frequently used is stored in the last address of the memory area, and a second destination party information related to destination parties where a call was placed or received in the past are rearranged in the sequence of newer calls and stored sequentially from the first address, and in the initial status, the latest second destination party information stored in the first address and the fixed first destination party information stored in the last address are displayed on the display section by scrolling.

19 Claims, 18 Drawing Sheets

| MEMORY AREA | STORED CONTENT |
|---|---|
| 1 (SET) | TELEPHONE NUMBER E |
| 2 | TELEPHONE NUMBER D |
| 3 | TELEPHONE NUMBER C |
| 4 (SET) | TELEPHONE NUMBER B |
| 5 | TELEPHONE NUMBER A |

FIG. 3(a)

| MEMORY AREA | STORED CONTENT |
|---|---|
| 1 (SET) | TELEPHONE NUMBER E |
| 2 | TELEPHONE NUMBER A |
| 3 | TELEPHONE NUMBER D |
| 4 (SET) | TELEPHONE NUMBER B |
| 5 | TELEPHONE NUMBER C |

FIG. 3(b)

| MEMORY AREA | STORED CONTENT |
|---|---|
| 1 (SET) | TELEPHONE NUMBER E |
| 2 | TELEPHONE NUMBER F |
| 3 | TELEPHONE NUMBER A |
| 4 (SET) | TELEPHONE NUMBER B |
| 5 | TELEPHONE NUMBER D |

FIG. 3(c)

| MEMORY AREA | STORED CONTENT |
|---|---|
| 1 (SET) | TELEPHONE NUMBER E |
| 2 | TELEPHONE NUMBER D |
| 3 | TELEPHONE NUMBER C |
| 4 (SET) | TELEPHONE NUMBER B |
| 5 | TELEPHONE NUMBER A |

FIG. 4(a)

| MEMORY AREA | STORED CONTENT |
|---|---|
| 1 | TELEPHONE NUMBER F |
| 2 (SET) | TELEPHONE NUMBER E |
| 3 | TELEPHONE NUMBER D |
| 4 | TELEPHONE NUMBER C |
| 5 (SET) | TELEPHONE NUMBER B |

FIG. 4(b)

| MEMORY AREA | STORED CONTENT |
|---|---|
| 1 | TELEPHONE NUMBER G |
| 2 | TELEPHONE NUMBER F |
| 3 (SET) | TELEPHONE NUMBER E |
| 4 | TELEPHONE NUMBER D |
| 5 (SET) | TELEPHONE NUMBER B |

FIG. 4(c)

| MEMORY AREA | STORED CONTENT |
|---|---|
| 1 | TELEPHONE NUMBER H |
| 2 | TELEPHONE NUMBER G |
| 3 | TELEPHONE NUMBER F |
| 4 (SET) | TELEPHONE NUMBER E |
| 5 (SET) | TELEPHONE NUMBER B |

FIG. 4(d)

| MEMORY AREA | STORED CONTENT |
|---|---|
| 1 | TELEPHONE NUMBER I |
| 2 | TELEPHONE NUMBER H |
| 3 | TELEPHONE NUMBER H |
| 4 (SET) | TELEPHONE NUMBER E |
| 5 (SET) | TELEPHONE NUMBER B |

FIG. 4(e)

| MEMORY AREA | STORED CONTENT |
|---|---|
| 1 (SET) | TELEPHONE NUMBER B |
| 2 | TELEPHONE NUMBER I |
| 3 | TELEPHONE NUMBER H |
| 4 | TELEPHONE NUMBER G |
| 5 (SET) | TELEPHONE NUMBER E |

| MEMORY AREA | STORED CONTENT |
|---|---|
| 1 | TELEPHONE NUMBER E |
| 2 | TELEPHONE NUMBER D |
| 3 | TELEPHONE NUMBER C |
| 4 | TELEPHONE NUMBER B |
| 5 | TELEPHONE NUMBER A |

FIG. 5(b)

| MEMORY AREA | STORED CONTENT |
|---|---|
| 1 (SET) | TELEPHONE NUMBER C |
| 2 | TELEPHONE NUMBER E |
| 3 | TELEPHONE NUMBER D |
| 4 | TELEPHONE NUMBER B |
| 5 (SET) | TELEPHONE NUMBER A |

FIG. 5(c)

| MEMORY AREA | STORED CONTENT |
|---|---|
| 1 (SET) | TELEPHONE NUMBER C |
| 2 | TELEPHONE NUMBER F |
| 3 | TELEPHONE NUMBER E |
| 4 | TELEPHONE NUMBER D |
| 5 | TELEPHONE NUMBER B |

FIG. 5(d)

| MEMORY AREA | STORED CONTENT |
|---|---|
| 1 (SET) | TELEPHONE NUMBER C |
| 2 (SET) | TELEPHONE NUMBER F |
| 3 | TELEPHONE NUMBER E |
| 4 | TELEPHONE NUMBER D |
| 5 | TELEPHONE NUMBER B |

FIG. 5(e)

| MEMORY AREA | STORED CONTENT |
|---|---|
| 1 (SET) | TELEPHONE NUMBER C |
| 2 (SET) | TELEPHONE NUMBER F |
| 3 | TELEPHONE NUMBER G |
| 4 | TELEPHONE NUMBER E |
| 5 | TELEPHONE NUMBER D |

FIG. 5(f)

| MEMORY AREA | STORED CONTENT |
|---|---|
| 1 (SET) | TELEPHONE NUMBER C |
| 2 (SET) | TELEPHONE NUMBER F |
| 3 (SET) | TELEPHONE NUMBER H |
| 4 | TELEPHONE NUMBER G |
| 5 | TELEPHONE NUMBER E |

| MEMORY AREA | STORED CONTENT |
|---|---|
| 1 | TELEPHONE NUMBER E (3 TIMES) |
| 2 | TELEPHONE NUMBER D (2 TIMES) |
| 3 | TELEPHONE NUMBER C (1 TIMES) |
| 4 | TELEPHONE NUMBER B (1 TIMES) |
| 5 | TELEPHONE NUMBER A (1 TIMES) |

FIG. 6(a)

| MEMORY AREA | STORED CONTENT |
|---|---|
| 1 | TELEPHONE NUMBER E (3 TIMES) |
| 2 | TELEPHONE NUMBER B (2 TIMES) |
| 3 | TELEPHONE NUMBER D (2 TIMES) |
| 4 | TELEPHONE NUMBER C (1 TIMES) |
| 5 | TELEPHONE NUMBER A (1 TIMES) |

FIG. 6(b)

| MEMORY AREA | STORED CONTENT |
|---|---|
| 1 | TELEPHONE NUMBER E (3 TIMES) |
| 2 | TELEPHONE NUMBER B (2 TIMES) |
| 3 | TELEPHONE NUMBER D (2 TIMES) |
| 4 | TELEPHONE NUMBER F (1 TIMES) |
| 5 | TELEPHONE NUMBER C (1 TIMES) |

FIG. 6(c)

| MEMORY AREA | STORED CONTENT |
|---|---|
| 1 | TELEPHONE NUMBER E (3 TIMES) |
| 2 | TELEPHONE NUMBER F (2 TIMES) |
| 3 | TELEPHONE NUMBER B (2 TIMES) |
| 4 | TELEPHONE NUMBER D (2 TIMES) |
| 5 | TELEPHONE NUMBER C (1 TIMES) |

FIG. 6(d)

| MEMORY AREA | STORED CONTENT |
|---|---|
| 1 | TELEPHONE NUMBER F (3 TIMES) |
| 2 | TELEPHONE NUMBER B (2 TIMES) |
| 3 | TELEPHONE NUMBER D (2 TIMES) |
| 4 | TELEPHONE NUMBER E (1 TIMES) |
| 5 | TELEPHONE NUMBER C (1 TIMES) |

FIG. 6(e)

| MEMORY AREA | STORED CONTENT |
|---|---|
| 1 | TELEPHONE NUMBER F (3 TIMES) |
| 2 | TELEPHONE NUMBER B (2 TIMES) |
| 3 | TELEPHONE NUMBER D (2 TIMES) |
| 4 | TELEPHONE NUMBER G (1 TIMES) |
| 5 | TELEPHONE NUMBER E (1 TIMES) |

FIG. 6(f)

| ADDRESS | STORED CONTENT |
|---|---|
| A 1 | D 1 |
| A 2 | D 2 |
| A 3 | D 3 |
| A 4 | D 4 |
| A 5 | D 5 |
| ⋮ | ⋮ |
| A (n−2) | D (n−2) |
| A (n−1) | D (n−1) |
| A n | F |

FIG. 7

| ADDRESS | STORED CONTENT |
|---------|----------------|
| A11     | D1             |
| A12     | D2             |
| A13     | D3             |
| A14     | D4             |
| A15     | D5             |
| ⋮       | ⋮              |
| A1(n-2) | D(n-2)         |
| A1(n-1) | D(n-1)         |
| A1n     | Dn             |

FIG. 12(a)

| ADDRESS | STORED CONTENT |
|---------|----------------|
| A21     | F1             |
| A22     | F2             |
| A23     | F3             |
| A24     | F4             |
| A25     | F5             |
| ⋮       | ⋮              |
| A2(N-2) | F(N-2)         |
| A2(N-1) | F(N-1)         |
| A2N     | FN             |

FIG. 12(b)

| ADDRESS | STORED CONTENT |
|---------|----------------|
| A11 | D1 |
| A12 | D2 |
| A13 | D3 |
| A14 | D4 |
| A15 | D5 |
| ⋮ | ⋮ |
| A1(n-2) | D(n-2) |
| A2(n-1) | D(n-1) |
| A1n | Dn |

FIG. 15 (a)

| ADDRESS | STORED CONTENT |
|---------|----------------|
| A21 | F1 |
| A22 | F2 |
| A23 | F3 |
| A24 | F4 |
| A25 | F5 |
| ⋮ | ⋮ |
| A2(n-2) | F(n-2) |
| A2(n-1) | F(n-1) |
| A2n | Fn |

FIG. 15 (b)

| ADDRESS | STORED CONTENT |
|---------|----------------|
| A31 | R1 |
| A32 | R2 |
| A33 | R3 |
| A34 | R4 |
| A35 | R5 |
| ⋮ | ⋮ |
| A3(n-2) | R(N-2) |
| A3(n-1) | R(N-1) |
| A3n | Rn |

FIG. 15 (c)

| MEMORY AREA | STORED CONTENT |
|---|---|
| 1 | TELEPHONE NUMBER E |
| 2 | TELEPHONE NUMBER D |
| 3 | TELEPHONE NUMBER C |
| 4 | TELEPHONE NUMBER B |
| 5 | TELEPHONE NUMBER A |

FIG. 18(a)

| MEMORY AREA | STORED CONTENT |
|---|---|
| 1 | TELEPHONE NUMBER B |
| 2 | TELEPHONE NUMBER E |
| 3 | TELEPHONE NUMBER D |
| 4 | TELEPHONE NUMBER C |
| 5 | TELEPHONE NUMBER A |

FIG. 18(b)

| MEMORY AREA | STORED CONTENT |
|---|---|
| 1 | TELEPHONE NUMBER F |
| 2 | TELEPHONE NUMBER B |
| 3 | TELEPHONE NUMBER E |
| 4 | TELEPHONE NUMBER D |
| 5 | TELEPHONE NUMBER C |

FIG. 18(c)

COMMUNICATION TERMINAL

TECHNICAL FIELD

The present invention relates to a communication terminal which executes a call operation in a state where a destination party information is displayed on,a display so that a call can be placed to a destination party related to the destination party information displayed on the display, and more particularly to a communication terminal which operability is improved by devising management of a destination party information for a display and the display mode.

BACKGROUND ART

A conventional communication terminal, such as a portable radio telephone, has a function to execute a call operation to a destination party in a state where the destination party information is displayed on a display, so that a call can be placed to the destination party related to the destination party information displayed on the display.

In such a communication terminal, a redial function is known, where information input by key operation is stored in a memory, and when the same information is to be input, the stored information is read by a simple key operation and the read information is displayed on the display, so as to improve the call operation.

In a redial function, for example, a destination party telephone number which is input when a call is placed, is stored in a memory, and when a call is to be placed to the same party again, the telephone number stored in the memory is called up on the screen of the display for placing the call.

A telephone directory function is also known, where a plurality of telephone numbers are stored in a memory, a target telephone number for placing a call is selected from the plurality of stored telephone numbers by pressing a retrieval key, and the telephone number is called up on the display for placing the call.

Now, the redial function of a conventional communication terminal will be explained referring to FIG. 18.

FIG. 18 shows the relationship between telephone numbers and memory areas (addresses) in a memory for implementing the redial function of a communication terminal.

In FIG. 18, a destination party telephone number E used for the last call is stored in a memory area "1", a destination party telephone number D used in the first call before last is stored in a memory area "2", and in the same manner, destination party telephone numbers C, B and A used in the second, third and fourth calls before last are stored in memory areas "3", "4" and "5" respectively.

To place a call to the telephone number E in a state where the telephone numbers A to E are stored in the memory areas "1" to "5", as FIG. 18(*a*) shows, the redial button is pressed once to call up the telephone number E stored in the memory area "1", then the call button is pressed to place a call to the telephone number E.

If the redial button is pressed again after calling up the telephone number E stored in the memory area "1" by pressing the redial button, then the telephone number D stored in the memory area "2" is called up. To place a call to the telephone number B, press the redial button four times to call up the telephone number B stored in the memory area "4", then press the call button.

When a call is placed to the telephone number B, the relationship between the memory areas and stored contents changes, as shown in FIG. 18(*b*), where the telephone number B is stored in the memory area "1", so that the telephone number B is called up when the redial button is pressed once.

When a call is placed to a telephone number F, which is not stored in any one of the memory areas "1" to "5", by normal button operation (pressing numeric buttons) after placing a call to the telephone number B, the relationship between the memory areas and stored contents becomes as shown in FIG. 18(*c*).

FIG. 18(*c*) shows the status where the telephone number F, which was used for the last call, is stored in the memory area "1", the telephone numbers B, E, D and C stored in the memory areas "1" to "4" in the state shown in FIG. 18(*b*) are shifted to the memory areas "2" to "5" respectively, and the telephone number A, stored in the memory area "5" in the state shown in FIG. 18(*b*), is erased, and in this way, the destination party telephone numbers used in the last five calls are always stored in the memory.

The telephone numbers stored in the memory are often the telephone numbers frequently used, and operation is easier than an abbreviated dialing function since the telephone numbers can be called up merely by pressing the redial button, therefore this redial function is one function frequently used among the functions of a communication terminal.

However, if telephone numbers which are not frequently used are continuously called, all these telephone numbers which are not used frequently are stored in the memory to store telephone numbers for the redial function, while the telephone numbers which are frequently used are erased. To place a call to such an erased telephone number which is frequently used, the user must execute a call operation using normal numeric buttons or the abbreviated dialing function, which is inconvenient for a user who often uses the redial function, and which also decreases the effectiveness of the redial function.

DISCLOSURE OF THE INVENTION

With the foregoing in view, it is an object of the present invention to provide a communication terminal which can manage destination party information to be stored as the redial information without erasing the destination party information which is frequently used.

It is another object of the present invention to provide a communication terminal where the operability of calling is improved by effectively storing and displaying destination party information used for calling.

To achieve the above objects, according to one aspect the invention includes a communication terminal which executes a call operation in a state where destination party information is displayed on a display so that a call is placed to a destination party related to the destination party information displayed on the display, comprising:

setting means for setting a first destination party information indicating at least one specific destination party;

storage means for storing the first destination party information set by the setting means and a second destination party information related to destination parties where a call was placed or received in the past; and display control means for scrollably displaying the first destination party information and the second destination party information stored in the storage means on the display.

In a further aspect, the storage means stores the second destination party information sequentially in the storage means in a manner as to follow the first destination party information set by the setting means, based on a difference between a time when a call was placed in the past and a current time.

In another further aspect, the storage means stores the second destination party information sequentially in the storage means in a manner as to follow the first destination party information set by the setting means, based on a difference between a time when a call was placed in the past and a time when a call was received in the past and a current time.

In still another further aspect, the storage means stores the first destination party information in a fixed storage area.

In yet another further aspect, the storage means changes a storage area for storing the first destination party information when a new call is placed or received.

According to another further aspect, the storage means comprises a ring buffer where the second destination party information is rearranged in a sequence of newer calls placed or received and is stored from a first address, the first destination party information is stored in a last address, and the first address and the last address are logically linked, and the display control means controls the display of the second destination party information and the first destination party information stored in the ring buffer in the stored sequence on the display in a manner as to be able to scroll in two opposite directions.

In still another aspect, the display control means displays the second destination party information stored in the first address of the storage means as the destination party information to be displayed on the display means in an initial state.

According to yet another further aspect, the display control means displays the first or second destination party information stored in an address adjacent to an address, where the first or second destination party information of the storage means is stored, on the display, along with the first or second destination party information to be displayed on the display means.

According to another further aspect, the storage means comprises:
    a first ring buffer where the first destination party information is stored in a sequence of significance from the first address and the first address and the last address are logically linked, and
    a second ring buffer where the second destination party information is rearranged in a sequence of newer calls placed or received and is stored from the first address, and the first address and the last address are logically linked,
    wherein the display control means controls the display of the second destination party information stored in the second ring buffer in the stored sequence in a manner as to be able to scroll in two opposite directions on the display, and at the same time, by switching to the second destination party information display, the display control means controls the display of the first destination party information stored in the first ring buffer in the stored sequenced in a manner as to be able to scroll in two opposite directions on the display.

In another aspect, the invention includes a communication terminal which executes a call operation in a state where destination party information is displayed on a display so that a call is placed to a destination party related to the destination party information displayed on the display, comprising:
    counting means for counting an accumulated number of calls which were placed for a destination party information;
    storage means for storing the destination party information sequentially based on a count measured by the counting means; and
    display control means for scrollably displaying the destination party information stored in the storage means on the display.

In another further aspect, the counting means inhibits counting of subsequent calls when a plurality of calls is continuously placed for the same destination party information within a predetermined time.

According to another aspect, the invention includes a communication terminal which executes a call operation in a state where destination party information is displayed on a display so that a call is placed to a destination party related to the destination party information displayed on the display, comprising:
    a plurality of ring buffers where the destination party information is sequentially stored from a first address and the first address and a last address are logically linked;
    first selection means for selecting one of the plurality of ring buffers; and
    second selection means for scrolling the second destination party information stored in a ring buffer selected by the selection means in two opposite directions on the display according to the stored sequence, so as to select a desired destination party information stored in the ring buffer.

According to another aspect, the first selection means is implemented by a horizontal scrolling function and the second selection means is implemented by a vertical scrolling function.

In a still further aspect, the horizontal scrolling function and the vertical scrolling function are implemented by a single key which has a four-directional control function.

In another further aspect, the destination party information stored in one of the plurality of ring buffers includes destination party information on destination parties where a call was placed or received in the past.

According to another further aspect, the destination party information stored in one of the plurality of ring buffers includes destination party information on an originator who placed a call but the call was not received and responded to.

In yet another further aspect, the destination party information stored in one of the plurality of ring buffers includes destination party information which is set by an operator.

In still another further aspect, the invention includes telephone directory storage means where telephone numbers and identification information for respective telephone numbers are stored, wherein the destination party information is identification information stored in the telephone directory storage means.

BRIEF DESCRIPTION OF THE DRAWINGS

FIGS. 3(a) to 3(c) are drawings showing the relationship between memory areas and destination party telephone numbers in the memory shown in FIG. 1;

FIGS. 4(a) to 4(f) are drawings showing the relationship between memory areas and destination party telephone numbers in the memory in accordance with the second embodiment of the present invention;

FIGS. 5(a) to 5(f) are drawings showing the relationship between memory areas and destination party telephone numbers in the memory in accordance with the third embodiment of the present invention;

FIGS. 6(a) to 6(f) are drawings showing the relationship between memory areas and destination party telephone numbers in the memory in accordance with the fourth embodiment of the present invention;

FIG. 7 is a drawing showing a concrete example of data stored in the redial storage area of the memory shown in FIG. 1;

FIGS. 12(a) and 12(b) are drawings showing another example of data which is stored in the memory area of the memory by control of the control section of the communication terminal shown in FIG. 1;

FIGS. 15(a) to 15(c) are drawings showing another example of the data which is stored in the memory area of the memory by control of the control section of the communication terminal shown in FIG. 1;

FIGS. 18(a) to 18(c) are drawings for describing the conventional redial function.

BEST MODE FOR CARRYING OUT THE INVENTION

The embodiments of the present invention will now be described with reference to the accompanying drawings.

Figure 1:
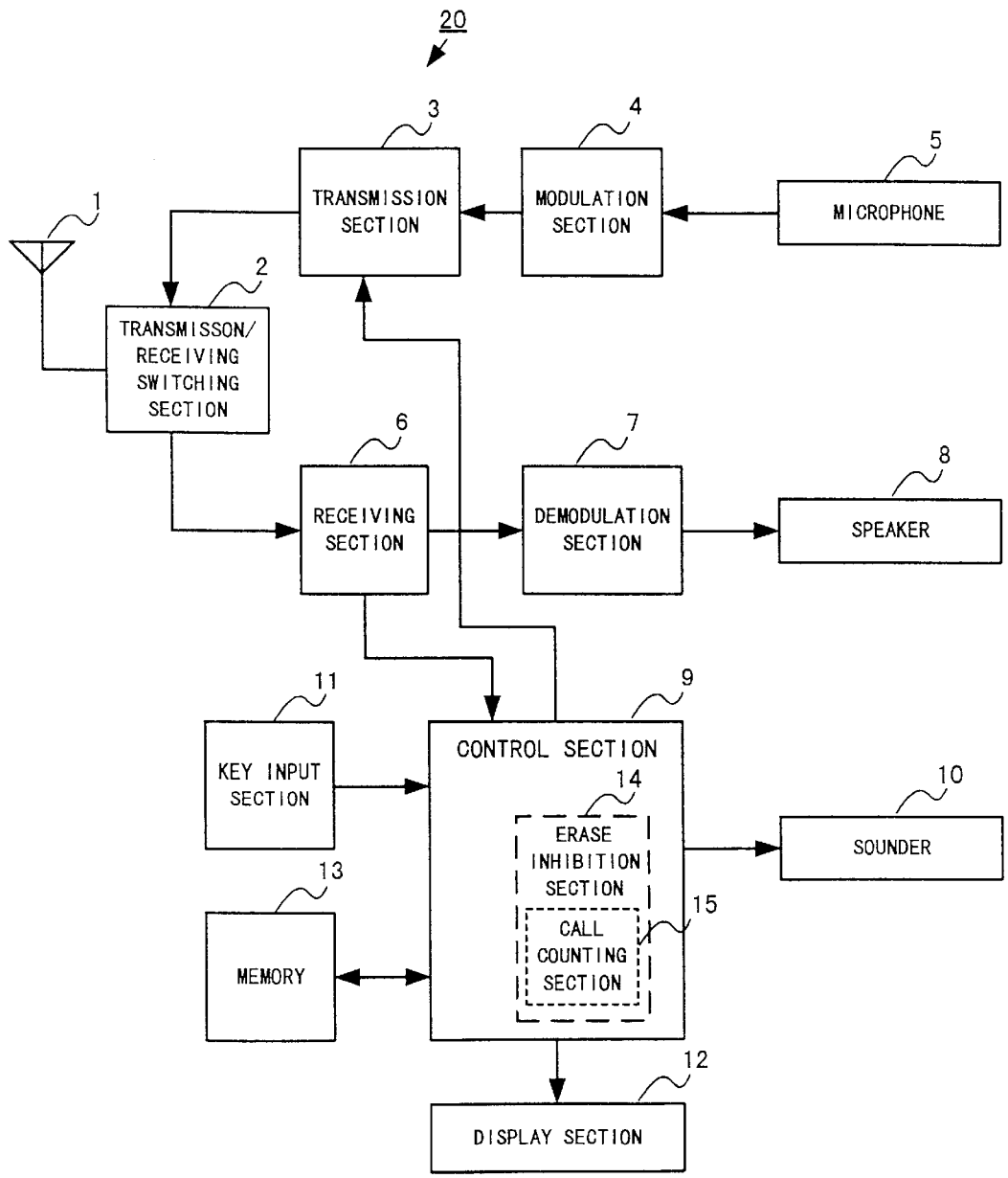
FIG. 1 is a block diagram showing the configuration of a communication terminal of the first embodiment in accordance with the present invention.

FIG. 1 is a block diagram showing a first embodiment of a communication terminal in accordance with the present invention.

In FIG. 1, the communication terminal 20 comprises an antenna 1, a transmission-receiving switching section 2, a transmission section 3, a modulation section 4, a microphone 5, a receiving section 6, a demodulation section 7, a speaker 8, a control section 9, a sounder 10, a key input section 11, a display section 12 and a memory 13.

The control section 9 has an erase inhibition section 14, and a call counting section 15 is disposed in the erase inhibition section 14.

To place a call using this communication terminal 20, the control section 9 transmits control signals from the antenna 1 via the transmission section 3 and the transmission-receiving switching section 2, and connects the line using a destination party telephone number which is input from the key input section 12 or a telephone number stored in the memory 13 (e.g. abbreviated dial, redial).

To receive a call, the control section 9 receives a call arrival signal via the antenna 1, the transmission-receiving switching section 2 and the receiving section, and sounds a ring back tone, and when a user hears the ring back tone and executes operation at the key input section 11, the control section 9 transmits a call arrival confirmation signal from the antenna 1 via the transmission section 3 and the transmission-receiving switching section 2 and connects the line.

Even after the line is connected, the control section 9 sends/receives control signals through the antenna 1, the transmission-receiving switching section 2, the transmission section 3, and the receiving section 6, and at the same time, the user has conversation via the antenna 1, the transmission-receiving switching section 2, the transmission section 3, the modulation section 4, the microphone 5, the receiving section 6, the demodulation section 7 and the speaker 8.

The communication terminal 20 stores destination party information (destination party telephone numbers) which is input by operation of the key input section 11 in the memory 13 when a call is placed, and to place a call to the same destination party telephone number again, the destination party information for redialing which is stored in the memory 13 can be used for placing the call by the operation of the key input section 11.

When the user wants to set a destination party telephone number that will not be erased, the user registers this destination party telephone number to the control section 9 from the key input section 11, then the control section 9 activates the erase inhibition section 14 so that the destination party telephone number specified by the user will not be erased from the memory 13.

Management of the destination party information (destination party telephone numbers) in the memory 13 in accordance with the first embodiment will now be explained referring to FIG. 2 and FIG. 3.

Figure 2:
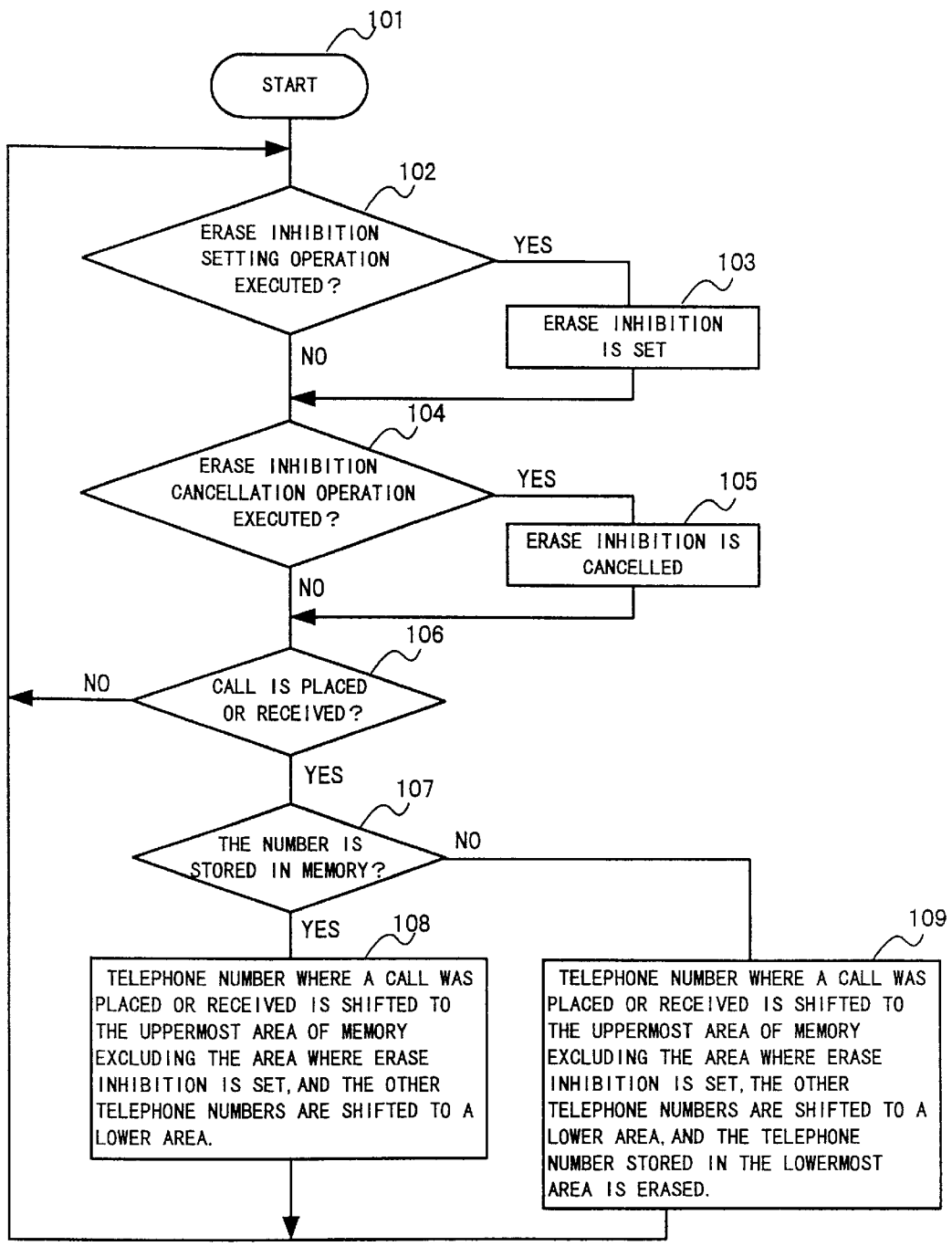
FIG. 2 is a flow chart showing the processing flow of the communication terminal shown in FIG. 1.

FIG. 2 is a flow chart showing the processing flow of the communication terminal shown in FIG. 1, and FIG. 3 is a drawing showing the relationship between memory areas and destination party telephone numbers in the memory 13 of the communication terminal shown in FIG. 1.

In the memory areas (addresses) shown in FIG. 3, "1" is the uppermost area (that is, the area storing the telephone number to be displayed first by redial operation), and "5" is the lowermost area.

When the power of the radio communication terminal 20 is turned ON and processing begins (Step 101), this processing stands by until an event, that is, an erase inhibition setting operation for a telephone number stored in the memory 13 (Step 102), erase inhibition cancellation operation (Step 104) or placing or receiving a call (Step 106), occurs.

When an erase inhibition setting operation for a telephone number stored in the memory 13 is executed here (YES in Step 102), the erase inhibition is set for the target telephone number (Step 103), and when erase inhibition cancellation operation is executed here (Step 104), setting of erase inhibition of the target telephone number is cancelled (Step 105).

Now assume that the erase inhibition section 14 sets erase inhibition for the telephone number E and the telephone number B which are stored in the memory area "1" and the memory area "4" by operation of the user in a state where the telephone numbers A to E are sequentially stored in the memory areas "1" to "5" in the memory 13, as shown in FIG. 3(a).

When a call is placed to the telephone number A stored in the memory area "5" in the state shown in FIG. 3(a) (YES in Step 106), the telephone number A which is a telephone number stored in the memory 13 (YES in Step 107) is shifted to the uppermost memory area excluding the memory area for which erase inhibition is set, and the telephone numbers stored between the uppermost memory area and the memory area where the telephone number A was initially stored are shifted sequentially to a lower memory area (Step 108).

In other words, as FIG. 3(b) shows, the telephone number A stored in the memory area "5" (see FIG. 3(a)) is shifted to the uppermost memory area "2" excluding the memory area "1" and the memory area "4" for which erase inhibition is set, the telephone number D stored in the memory area "2" is shifted to the memory area "3", and the telephone number C stored in the memory area "3" is shifted to the memory area "5" respectively.

When a call is placed to the telephone number F, which is not stored in any one of the memory areas "1" to "5" (Yes in Step 106) in the state shown in FIG. 3(b), the telephone number F, which is a telephone number not stored in the memory 13 (NO in Step 107), is stored in the uppermost memory area excluding the memory areas for which erase inhibition is set, the other telephone numbers are shifted sequentially to a lower memory area, and the telephone number stored in the lowermost memory area is erased (Step 109).

In other words, as FIG. 3(c) shows, the telephone number F is stored in the memory area "2", the telephone number A stored in the memory area "2" is shifted to the memory area "3", and the telephone number D stored in the memory area "3" is shifted to the memory area "5" respectively, and the telephone number C stored in the memory area "5" is erased.

Therefore, in the case of the first embodiment, contents stored in the memory area "1" and the memory area "4", for which erase inhibition is set by the erase inhibition section 14, are fixed, and contents stored in the memory areas "2", "3" and "5", for which erase inhibition is not set, are overwritten to manage the history information.

The erase inhibition section 14 can set any number of erase inhibitions between "0" (no setting) and "5" (all set). If erase inhibition is set to "5", however, the original function of redialing is lost, so normally "4" or less value is set.

To place a call to a telephone number which is not stored in any one of the memory areas "1" to "5", the telephone number can be input not only by pressing the numerical keys of the key input section 11 but also by calling up the telephone number stored when a call is received (stored in another area in the memory 13).

A telephone number to be stored in another area when a call is received can be directly stored in the area related to the history information in the memory 13 along with the setting for erase inhibition without placing a call to the telephone number, and in this case too, the relationship between the memory areas and the telephone numbers changes, as in from FIG. 3(a) to FIG. 3(b) and from FIG. 3(b) to FIG. 3 (c).

Now the second embodiment of the communication terminal in accordance with the present invention will be explained.

In the second embodiment too, the configuration of the communication terminal is the one shown in the block diagram in FIG. 1, but the relationship between memory areas and destination party telephone numbers in the memory 13 is different from the first embodiment, and the memory area where a telephone number for which the erase inhibition section 14 sets erase inhibition is stored changes.

FIG. 4 is a drawing showing the relationship between memory areas and destination party telephone numbers in the memory 13 in accordance with the second embodiment.

Now assume that the erase inhibition section 14 sets erase inhibition for the telephone number E and the telephone number B, which are stored in the memory area "1" and the memory area "4" by operation of the user in a state where the telephone numbers A to E are sequentially stored in the memory areas "1" to "5" in the memory 13, as shown in FIG. 4(a).

To shift memory areas where telephone numbers for which erase inhibition are set are stored, a call is placed to the telephone number F, which is not stored in any one of the memory areas "1" to "5" in the state shown in FIG. 4(a), then the telephone number A stored in the memory area "5" (see FIG. 4(a)) is erased, and the telephone number F is stored in the memory area "1", as shown in FIG. 4(b). At this time, the telephone number E stored in the memory area "1" is shifted to the memory area "2", the telephone number stored in the memory area "2" is shifted to the memory area "3", the telephone number C stored in the memory area "3" is shifted to the memory area "4", and the telephone number B stored in the memory area "4" is shifted to the memory area "5" respectively, and erase inhibition setting addresses also shift along with the shift of the telephone numbers.

When a call is placed to the telephone number G, which is not stored in any one of memory areas "1" to "5" in this state, the telephone number C stored in the memory area "4" is erased, since erase inhibition is set for the telephone number B stored in the memory area "5", and the telephone number G is stored in the memory area "1", as shown in FIG. 4(c). At this time, the telephone number F stored in the memory area "1" is shifted to the memory area "2", the telephone number E stored in the memory area "2" is shifted to the memory area "3", and the telephone number D stored in the memory area "3" is shifted to the memory area "4" respectively.

When a call is placed to the telephone number H, which is not stored in any one of the memory areas "1" to "5" in this state, the telephone number D stored in the memory area "4" is erased, since erase inhibition is set for the telephone number B stored in the memory area "5", and the telephone number H is stored in the memory area "1" as shown in FIG. 4(d). At this time, the telephone number G stored in the memory area "1" is shifted to the memory area "2", the telephone number F stored in the memory area "2" is shifted to the memory area "3", and the telephone number E stored in the memory area "3" is shifted to the memory area "4" respectively.

When a call is placed to the telephone number I, which is not stored in any one of the memory areas "1" to "5" in this state, the telephone number F stored in the memory area "3" is erased, since erase inhibition is set for the telephone number B stored in the memory area "5" and the telephone number E stored in the memory area "4", and the telephone number I is stored in the memory area "1", as shown in FIG. 4(e). At this time, the telephone number H stored in the memory area "1" is shifted to the memory area "2", and the telephone number G stored in the memory area "2" is shifted to the memory area "3" respectively.

When a call is placed to the telephone number B stored in the memory area "5" in the state shown in FIG. 4(e), the telephone numbers are stored in the memory 13 without changing the relationship shown in FIG. 4(e). The telephone number B stored in the memory area "5" is shifted to the memory area "1" with erase inhibition set, and the telephone numbers stored in the memory areas "1" to "4" are shifted and stored to the memory areas "2" to "5" respectively, as shown in FIG. 4(f).

When the telephone numbers B and E, for which erase inhibition is set, are shifted to the memory areas "4" and "5" in this way, the memory areas storing the telephone numbers B and E no longer shift, and the stored content changes in the memory areas "1" to "3" (shift may occur if a call is placed to the telephone number B or E again, as mentioned above).

It is also possible that the telephone numbers for which erase inhibition is set are sequentially stored from the memory area "1" and the telephone numbers for which erase inhibition is set are called up on the display section 12 first when the redial button of the key input section 12 is pressed.

The erase inhibition section 14 can set any number of erase inhibitions between "0" (no setting) and "5" (all set) (normally "4" or less value is set).

To place a call to a telephone number which is not stored in any one of the memory areas "1" to "5", the telephone number can be input not only by pressing the numerical keys of the key input section 11 but also by calling up the telephone number stored when a call is received (stored in another area in the memory 13).

A telephone number to be stored in another area when a call is received can be directly stored in the area related to the history information in the memory 13 along with the setting of erase inhibition without placing a call to the telephone number, and also both a destination party telephone number when a call is placed and a destination party telephone number when a call is received can be stored in the memory 13 without distinction.

Now the third embodiment of the communication terminal in accordance with the present invention will be explained.

In the third embodiment too, the configuration of the communication terminal is the one shown in the block diagram of FIG. 1, but the relationship between memory areas and destination party telephone numbers in the memory 13 is different from the first embodiment, and a telephone number for which the erase inhibition section 14 sets erase inhibition is shifted to and stored in a predetermined memory area.

FIG. 5 is a drawing showing the relationship between memory areas and destination party telephone numbers in the memory 13 in accordance with the third embodiment.

Now assume that the erase inhibition section 14 sets erase inhibition for the telephone number C stored in the memory area "3" by operation of the user in a state where the telephone numbers A to E are sequentially stored in the memory areas "1" to "5" in the memory 13, as shown in FIG. 5(a), then the telephone number C is shifted to the memory area "1", and along with this, the telephone number D stored in the memory area "2" is shifted to the memory area "3", and the telephone number E stored in the memory area "1" is shifted to the memory area "2", as shown in FIG. 5(b).

When a call is placed to the telephone number F, which is not stored in any one of memory areas "1" to "5" in this state, the telephone number A stored in the memory area "5" (see FIG. 5(b)) is erased, and the telephone number F is stored in the memory area "2", as shown in FIG. 5(c). At this time, the telephone number E stored in the memory area "2" is shifted to the memory area "3", the telephone number D stored in the memory area "3" is shifted to the memory area "4", and the telephone number B stored in the memory area "4" is shifted to the memory area "5" respectively.

Since the telephone number C, for which erase inhibition is set, is stored in the memory area "1", the content stored in the memory area "1" does not change even if a new call is placed to a telephone number.

When erase inhibition is set for the telephone number F stored in the memory area "2" in this state, erase inhibition is set for the telephone number F and the memory area "2" becomes an erase inhibited area, since the memory area "1" has already been erase inhibited, as shown in FIG. 5(d), therefore the storage destination of the telephone number F, which was originally stored in the memory area "2" (see FIG. 5(c)), is not shifted.

When a call is placed to the telephone number G, which is not stored in any one of the memory areas "1" to "5" in this state, the telephone number B stored in the memory area "5" is erased, and the telephone number G is stored in the memory area "3", as shown in FIG. 5(e). At this time, the telephone number E stored in the memory area "3" is shifted to the memory area "4", and the telephone number D stored in the memory area "4" is shifted to the memory area "5" respectively, as shown in FIG. 5(e).

Since the telephone numbers C and F, for which erase inhibition is set, are stored in the memory areas "1" and "2", the stored content does not change even if a new call is placed to a telephone number.

The erase inhibition section 14 can set any number of erase inhibitions between "0" (no setting) and "5" (all set) (normally "4" or less value is set).

To place a call to a telephone number which is not stored in any one of the memory areas "1" to "5", the telephone number can be input not only by pressing the numerical keys of the key input section 11 but also by calling up the telephone number stored when a call is received (stored in another area in the memory 13).

A telephone number to be stored in another area when a call is received can be directly stored in the area related to the history information in the memory 13 along with the setting of erase inhibition without placing a call to the telephone number, and when erase inhibition is set for the telephone number H for which a call was received in the status shown in FIG. 5(e), the telephone number H is stored in the memory "3", the telephone number G stored in the memory area "3" is shifted to the memory area "4", the telephone number E stored in the memory area "4" is shifted to the memory area "5", and the telephone number D stored in the memory area "5" is erased, as shown in FIG. 5(f).

Now the fourth embodiment of the communication terminal in accordance with the present invention will be explained.

In the fourth embodiment too, the configuration of the communication terminal is the one shown in the block diagram in FIG. 1, but the erase inhibition section 14 sets erase inhibition not by setting by a user but by the frequency of use (placing a call) of the stored telephone number, based on the call count measured by the call counting section 15.

FIG. 6 is a drawing showing the relationship between memory areas and destination party telephone numbers in the memory 13 in accordance with the fourth embodiment.

Now assume that a call was placed three times to the telephone number E, twice to the telephone number D and once to the telephone numbers C, B and A respectively for a predetermined period in the past in a state where the telephone numbers A to E are sequentially stored in the memory areas "1" to "5" in the memory 13, as shown in FIG. 6 (a). A call count is measured by the call counting section 15 of the erase inhibition section 14 and is stored in the memory 13 along with the respective telephone numbers.

When a call is placed to the telephone number B stored in the memory area "4" in this state, and the telephone number B is stored in the memory area "2", the call count of the telephone number B becomes two, and at the same time the telephone number C stored in the memory area "3" is shifted to the memory area "4", and the telephone number D stored in the memory area "2" is shifted to the memory area "3", as shown in FIG. 6(b). In the memory areas "1" to "5", telephone numbers are sequentially stored from the higher call count.

When a call is placed to the telephone number F which is not stored in any one of the memory areas "1" to "5", the telephone number F, which has a call count of one, is stored in the memory area "4", the telephone number C stored in the memory area "4" is shifted to the memory area "5", and the telephone number A stored in the memory area "5" is erased, as shown in FIG. 6(c).

When a call is placed to the telephone number F stored in the memory area "4" in this state, the telephone number F is stored in the memory area "2", since the call count of the telephone number F becomes two, and at the same time, the telephone number B stored in the memory area "2" is shifted to the memory area "3", and the telephone number D stored in the memory area "3" is shifted to the memory area "4", as shown in FIG. 6(d).

Now assume that a call is again placed to the telephone number F stored in the memory area "2" and the call count of the telephone number E stored in the memory area "1" has been corrected to one since a predetermined period (e.g. one week, one month) has passed, then the telephone number F is stored in the memory area "1" since the call count of the telephone number F becomes three, but the telephone number B, which has a call count of two, is shifted from the memory area "3" to the memory area "1", the telephone number D, which has a call count of two, is shifted from the memory area "4" to the memory area "3", and the telephone number E is shifted to the memory area "4", as shown in FIG. 6(e), since the call count of the telephone number E is a now one.

When a call is placed to the telephone number G which is not stored in any one of the memory areas "1" to "5" in this state, the telephone number G. which has a call count of one, is stored in the memory area "4", the telephone number E stored in the memory area "4" is shifted to the memory area "5", and the telephone number C stored in the memory area "5" is erased, as shown in FIG. 6(f).

When a call is placed to a same number within a predetermined time (e.g. one hour), it is possible that the call may not be placed to a destination party telephone number which is frequently called, but to a destination party that was absent, therefore two or more calls placed to a same telephone number within a predetermined time may be counted as one call, so that the destination party telephone number to which two or more calls were placed is temporarily assumed to be a telephone number not frequently used.

In the second embodiment and the third embodiment, cancellation of the erase inhibition setting by the erase inhibition section 14 was not explained, however it is possible to cancel the erase inhibition setting by operation of the user, in the same way as the first embodiment, and in the fourth embodiment, it is possible to cancel erase inhibition and the destination party telephone number set there by operation of the user, assuming that the telephone number was frequently used because for any reason calls were continued without the user intention.

In the first embodiment to the fourth embodiment, a communication terminal was used for explanation, but this invention can be applied not only to a communication terminal but also to a device which is used by inputting information, for example, connecting to a destination party with network connection software, such as using a facsimile and a personal computer, setting the target location in a car navigation system (e.g. setting a same location, such as a home), and recording reservations on a video deck (e.g. reserving recording for a same channel at a same time).

FIG. 7 is a drawing showing a concrete example of data stored in a redial storage area 130 of the memory 13 by control of the control section 9 of the communication terminal 20 shown in FIG. 1.

In the redial storage area 130 shown in FIG. 7, data D1–D (n–1), indicating destination parties where calls were placed or received in the past, are stored in the addresses A1–A (n–1), and the data F, indicating a desired destination party which is fixed, is stored in the address An by the control of the control section 9.

The data indicating a destination party to which a call was placed in the past can be stored in the redial storage area 130 if the data indicating the destination party which was input or selected when the call was placed is saved, and the data indicating a destination party from which a call was received in the past can be stored in the redial storage area 130 if the data indicating the destination party which was sent from the destination party when a call was received is saved.

Here the data D1–D (n–1) is data comprised of two or more numeric digits indicating a destination party telephone number, or data indicating an abbreviated number which has been set for the destination party telephone number. The data D1–D (n–1) may be other numerics and symbols if those numerics and symbols correspond to the telephone number of a target destination party.

The data F is also comprised of two or more numeric digits indicating a destination party telephone number or data indicating an abbreviated number which has been set for the destination party, for example. This data F may also be comprised of other numerics or symbols if those numerics or symbols correspond to a target destination party.

Figure 8:
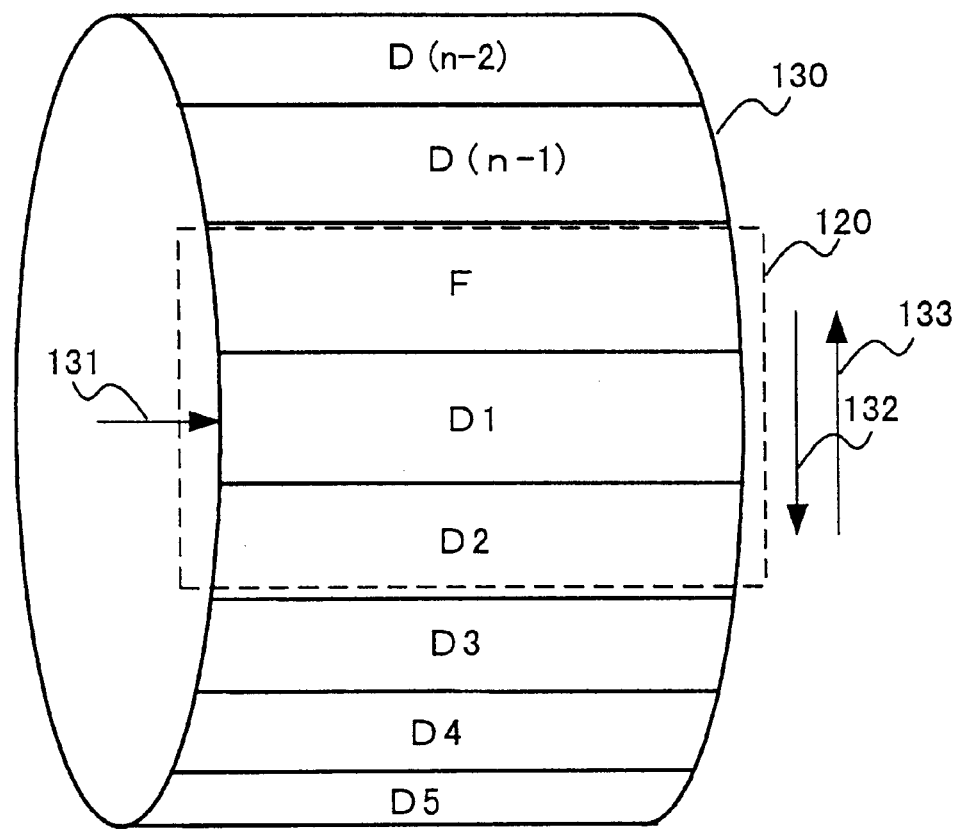
FIG. 8 is a drawing depicting the memory structure of the redial storage area shown in FIG. 7.

In the redial storage area 130 shown in FIG. 7, a ring buffer is formed, as shown in FIG. 8, where the first address A1 and the last address are logically linked by a pointer.

In FIG. 8, in the initial state where a redial button, which is not illustrated, of the key input section 11 shown in FIG. 1 is pressed, the pointer 131 specifies the first address A1 of the redial storage area 130.

The display area 120 on the display screen of the display section 12, shown in FIG. 12, is set for the content D1 of the first address A1 of the redial storage area 130 specified by the pointer 131, and for two logically adjacent addresses, that is, D2 and F, which are the content of A2 and An respectively, as shown in FIG. 8.

Therefore in the initial state where the redial button, which is not illustrated, of the key input section 11 shown in FIG. 1 is pressed, the content D1 of the first address A1 of the redial storage area 130 and the content F and D2 of addresses An and A2, which are the two addresses logically adjacent to D1, are displayed on the display area 120 on the display screen of the display section 12 shown in FIG. 1, with D1 at the center.

If call operation is executed by pressing the call button, which is not illustrated, of the key input section 11 shown in FIG. 1 in this state, a destination party, corresponding to the data D1 indicating a destination party related to the latest call placed or received which is displayed at the center of the display area 120, can be called up.

In accordance with the communication terminal 20 in this embodiment, the data D1, which is displayed at the center of the display area 120 on the display screen of the display section 12 shown in FIG. 1, can be scrolled in the forward direction 132 or backward direction 133 according to address by pressing the scroll buttons, which are not illustrated, of the key input section shown in FIG. 1.

Figure 9:
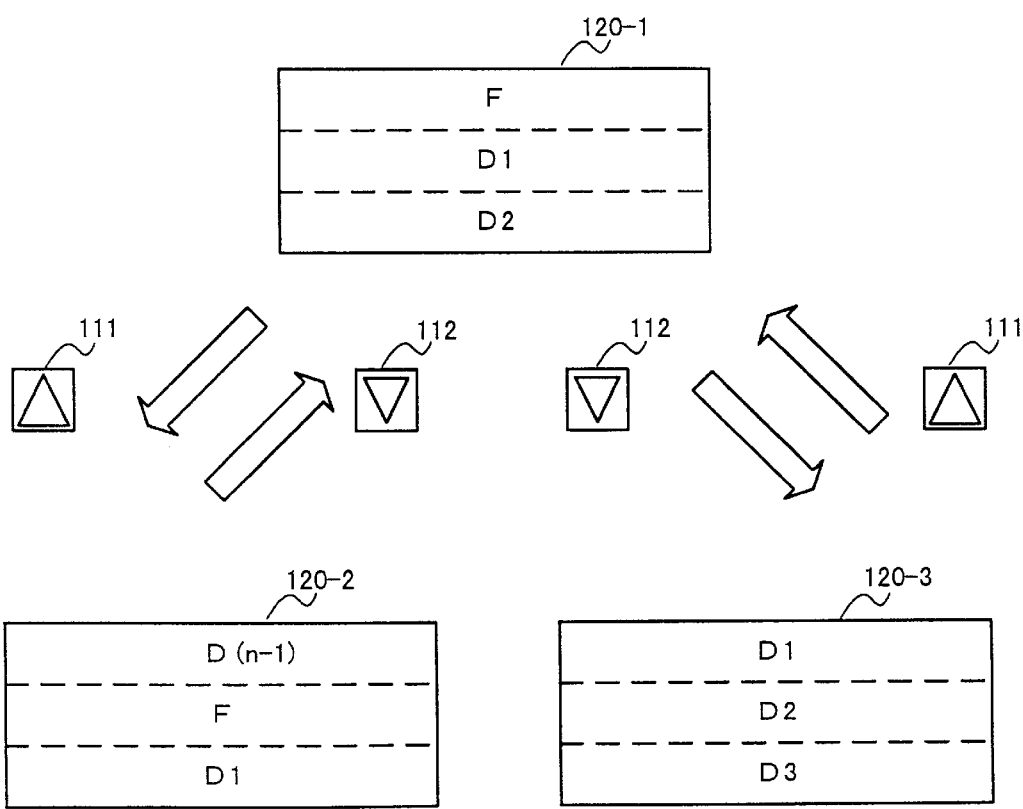
FIG. 9 is a drawing depicting the scrolling of data displayed on the display screen of the display section shown in FIG. 1 when the memory structure shown in FIG. 8 is used.

FIG. 9 is a drawing depicting the scrolling of data displayed at the center of the display area 120 on the display screen of the display section 12 shown in FIG. 1 when the scroll buttons of the key input section 11 shown in FIG. 1 are pressed.

If the top scroll button 111 of the key input section 11 shown in FIG. 1 is pressed in the initial state 120-1 where the data D1 is displayed at the center of the display area 120 on the display screen of the display section 12 and data F and D2 are displayed above and below the data D1, as shown in FIG. 9, the display of the display area 120 on the display screen of the display section 12 shifts to a state where the data F is displayed at the center and the data D (n–1) and D1 are displayed above and below the data F.

If call operation is executed by pressing the call button, which is not illustrated, of the key input section 11 shown in FIG. 1 in this state, a destination party, corresponding to the data F which indicates a fixed destination party to be displayed at the center of the display area 120, can be called up.

If the bottom scroll button 112 of the key input section 11 shown in FIG. 1 is pressed in the initial state 120-1 shown in FIG. 9, the display of the display area 120 on the display screen of the display section 12 shifts to a state where the data D2 is displayed at the center, and the data D1 and D3 are displayed above and below the data D2.

If call operation is executed by pressing the call button, which is not illustrated, of the key input section 11 shown in FIG. 1 in this state, a destination party, corresponding to the data D2 related to a second new call placed or received to be displayed at the center of the display area 120, can be called up.

If the top scroll button 111 is pressed again in this state 120-2, then the data D (n–1) is displayed at the center of the display area 120, and the data D (n–2) and F are displayed above and below the data D (n–1), and if the bottom scroll button 112 is pressed, the display state returns to the initial state 120-1 where the data D1 is displayed at the center of the display area 120 and the data F and D2 are displayed above and below the data D1.

In the same manner, if the bottom scroll button 112 is pressed again in the state 120-3, then the data D3 is displayed at the center of the display area 120, and the data D2 and D4 are displayed above and below the data D3, and if the top scroll button 111 is pressed, the display state returns to the initial state 120-1 where the data D1 is displayed at the center of the display area 120 and the data F and D2 are displayed above and below the data D1.

If call operation is executed in any state by pressing the call button, which is not illustrated, of the key input section 11 shown in FIG. 1, a destination party, corresponding to the data which indicates a fixed destination party to be displayed at the center of the display area 120, can be called up.

With such a configuration, in the initial state 120-1 where the redial button, which is not illustrated, of the key input section 11 shown in FIG. 1 is pressed, the data F, which indicates a desired destination party, can be displayed in the display area 120 on the display screen of the display section 12 shown in FIG. 1, along with the data D1 which indicates a destination party related to the latest call placed or received, and if the data on a frequently used destination party is stored as the data F indicating a desired destination party, then the frequently used destination party can be called up by such a simple operation as pressing the top scroll button and pressing the call button after the redial operation shown in FIG. 1, regardless of the history of calls placed or received in the past.

For the data F indicating a desired fixed destination party, data which the user input or selected by key operation may be used, but also data on a destination party where a call was placed or received may be specified and stored.

In the above embodiment, there is only one data F indicating a desired fixed destination party, but a plurality of data may be set as the data indicating fixed destination desired parties.

Figure 10:
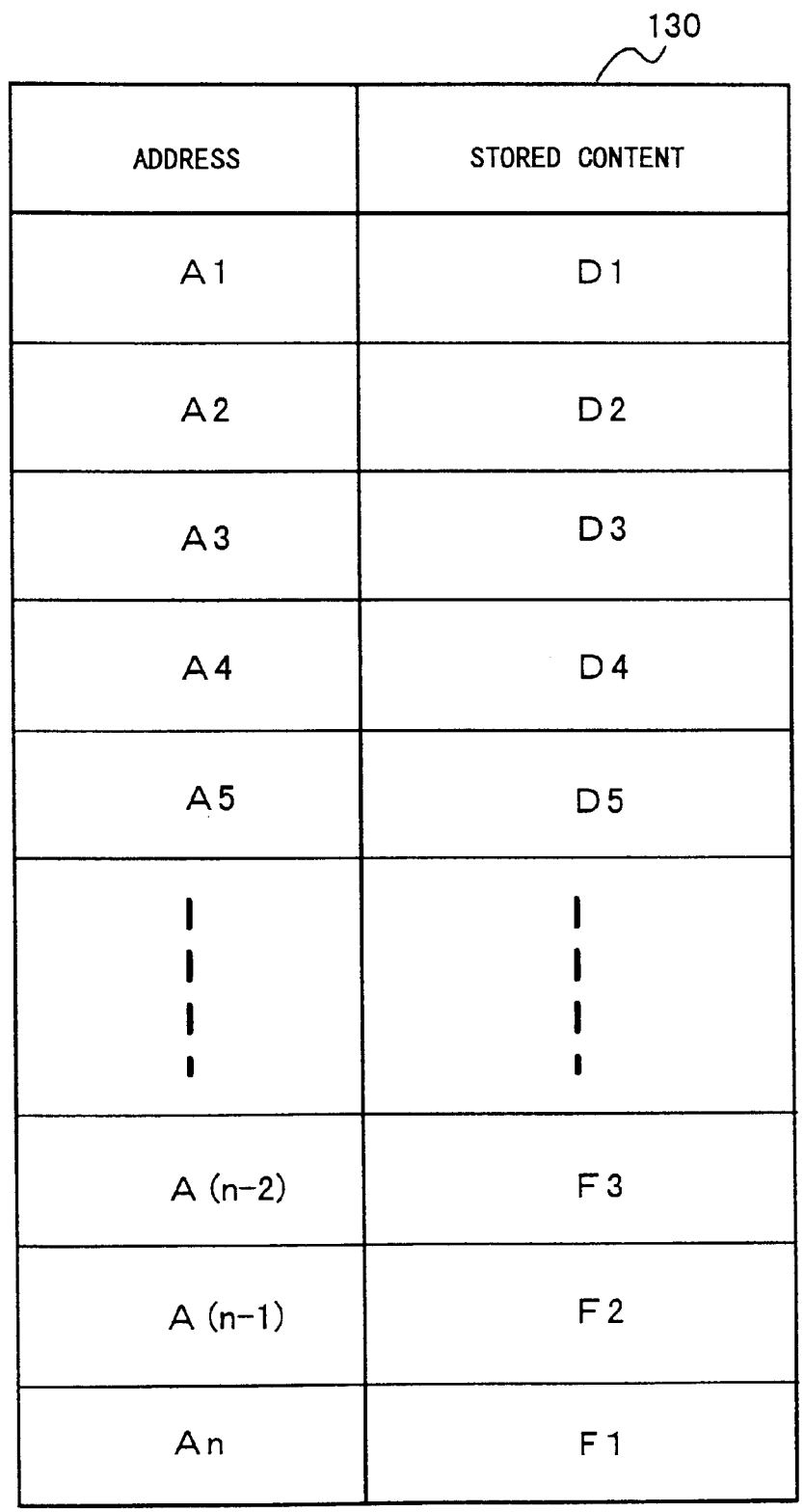
FIG. 10 is a drawing showing another concrete example of data stored in the memory area of the memory shown in FIG. 1.
Figure 11:
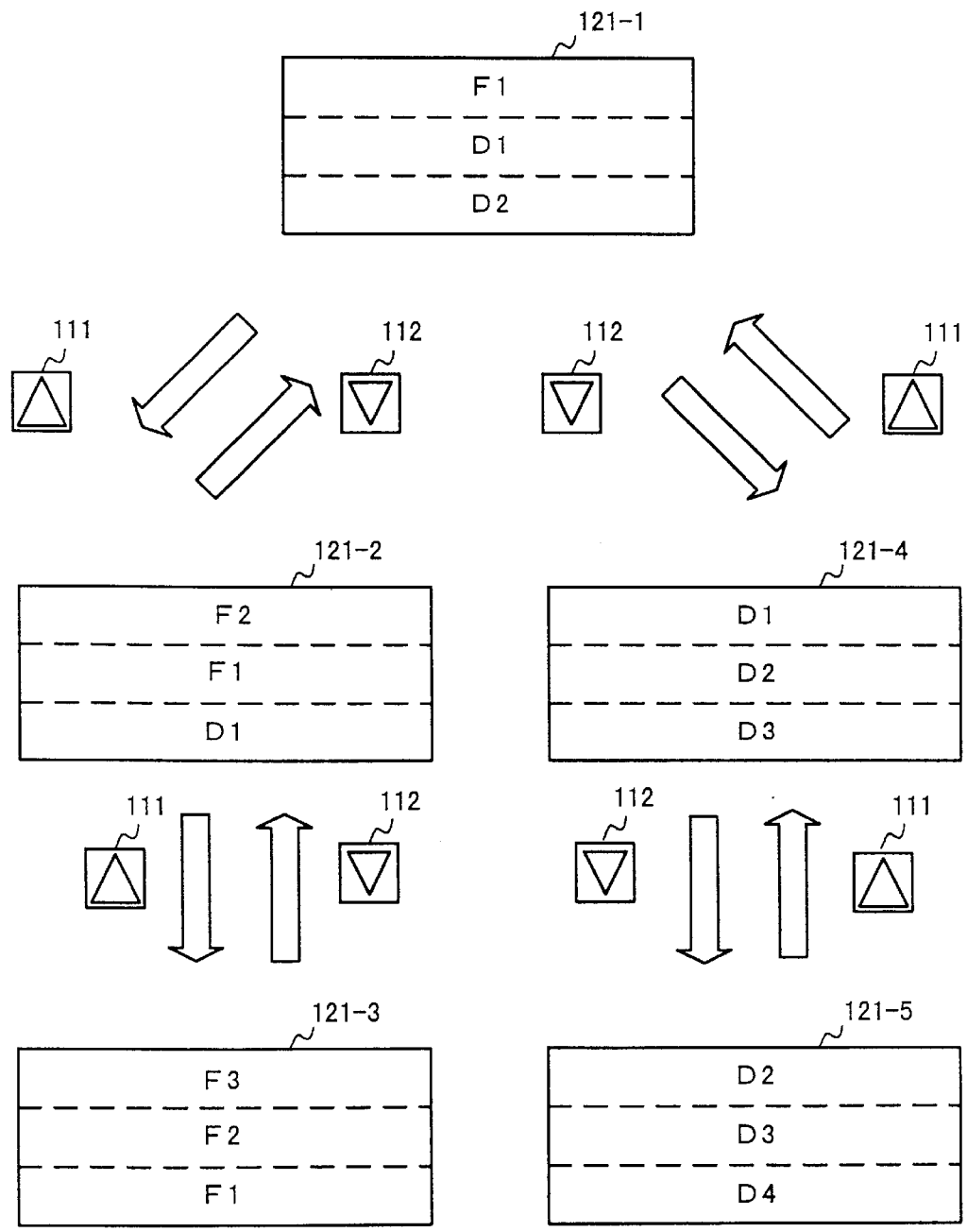
FIG. 11 is a drawing depicting the scrolling of data displayed on the display screen of the display section shown in FIG. 1 when the data structure shown in FIG. 10 is used.

FIG. 10 is a drawing showing an example of data stored in the redial storage area 130 of the memory 13 when there are a plurality of data indicating desired fixed destination parties.

In FIG. 10, the data D1, D2 . . . stored in the addresses A1, A2 . . . are data stored after rearranging the data indicating destination parties related to calls placed or received in the past in the sequence of newer calls placed or received. The data F1. F2 . . . stored in the addresses An, A (n–1), . . . are data stored after rearranging the data indicating desired fixed destination parties in the sequence of significance.

With such a configuration, in the initial state 121-1 where the redial button, which is not illustrated, of the key input section 11 shown in FIG. 1 is pressed, the content D1 of the first address A1 of the redial storage area 130 and the content F1 and D2 of the addresses An and A2, which are the two addresses logically adjacent to D1, are displayed in the display area 120 on the display screen of the display section 12 shown in FIG. 1, with the D1 at the center.

If the top scroll button 111 in the key input section 11 shown in FIG. 1 is pressed in this initial state 121-1, the display of the display area 120 on the display screen of the display section 12 shifts to the state 121-2, where the data F1 is displayed at the center and the data F2 and D1 are displayed above and below the data F1.

If the top scroll button 111 is pressed again, the display of the display area 120 shifts to the state 121-3 where the data F2 is displayed at the center, and the data F3 and F1 are displayed above and below the data F2, then display can be shifted in the same manner.

If the bottom scroll button 112 of the key input section 11 shown in FIG. 1 is pressed in the initial state 121-1, the display of the display area 120 on the display screen of the display section 12 shifts to the state 121-4, where the data D2 is displayed at the center, and the data D1 and D3 are displayed above and below the data D2.

And if the bottom scroll button 112 is pressed again, the display of the display area 120 shifts to the state 121-5, where the data D3 is displayed at the center and the data D2 and D4 are displayed above and below the data D3, then display can be shifted in the same manner.

If the bottom scroll button 112 is pressed in the state 121-3, the display of the display area 120 on the display screen shifts to the state 121-2, and if the bottom scroll button 112 is pressed again, then the display of the display area 120 on the display screen shifts to the state 121-1. In the same manner, if the top scroll button 111 is pressed in the state 121-5, the display of the display area 120 on the display screen shifts to the state 121-4, and if the top scroll button 111 is pressed again, then the display of the display area 120 on the display screen shifts to the state 121-1.

If call operation is executed in any state by pressing the call button, which is not illustrated, of the key input section 11 shown in FIG. 1, a destination party corresponding to the data which indicates a fixed destination party to be displayed at the center of the display area 120, can be called up.

With such a configuration, calls can be effectively placed using call operations to a plurality of fixed destination parties which were set and to a plurality of destination parties where a call was placed or received in the past.

In the above embodiment, the data indicating a destination party where a call was placed or received in the past and the data on a desired fixed destination party are stored in the same memory area (redial storage area) of the memory 13, but the data indicating a destination party where a call was placed or received in the past and the data on a desired fixed destination party may be stored in different memory areas of the memory 13, such that display is switched by pressing the left or right scroll buttons, which are not illustrated, of the key input section 11 shown in FIG. 1.

FIG. 12 is a drawing showing an example of data which is stored in the memory area 130 of the memory 13 by control of the control section 9 of the communication terminal 20 when the above configuration is used.

With the configuration shown in FIG. 12, the memory area of the memory 13 comprises a first memory area 130a (see FIG. 12(a)) where the data D1–Dn indicating destination parties where calls were placed or received in the past are stored in addresses A11–A1n after rearranging the data in, for example, the sequence of newer calls placed or received, and a second memory area 130b (see FIG. 12(b)) where the data F1–FN indicating desired fixed destination parties are stored in addresses A21–A2N after rearranging the data in, for example, the sequence of significance or in a predetermined sequence.

Figures 13A, 13B:
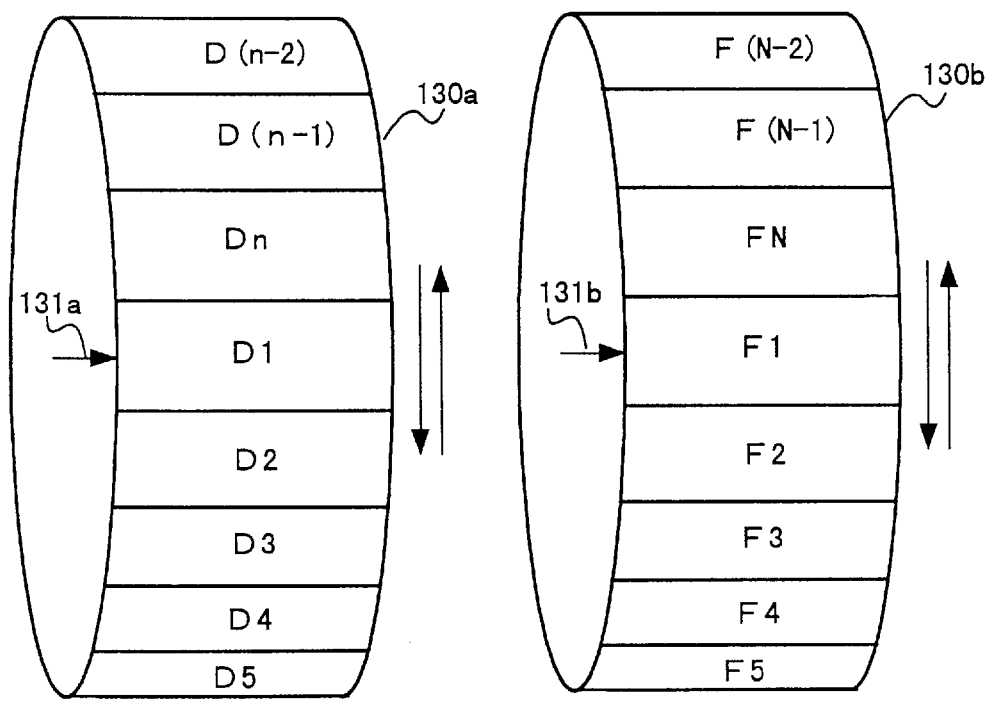
FIGS. 13(a) and 13(b) are drawings depicting the memory structure of the memory shown in FIG. 12.

Here the first memory area 130a and the second memory area 130b may be formed as ring buffers by logically linking the first address A11 and the last address A1N and the first address A21 and the last address A2N by a pointer 131a and 131b respectively, as shown in FIG. 13(a) and (b).

Figure 14:
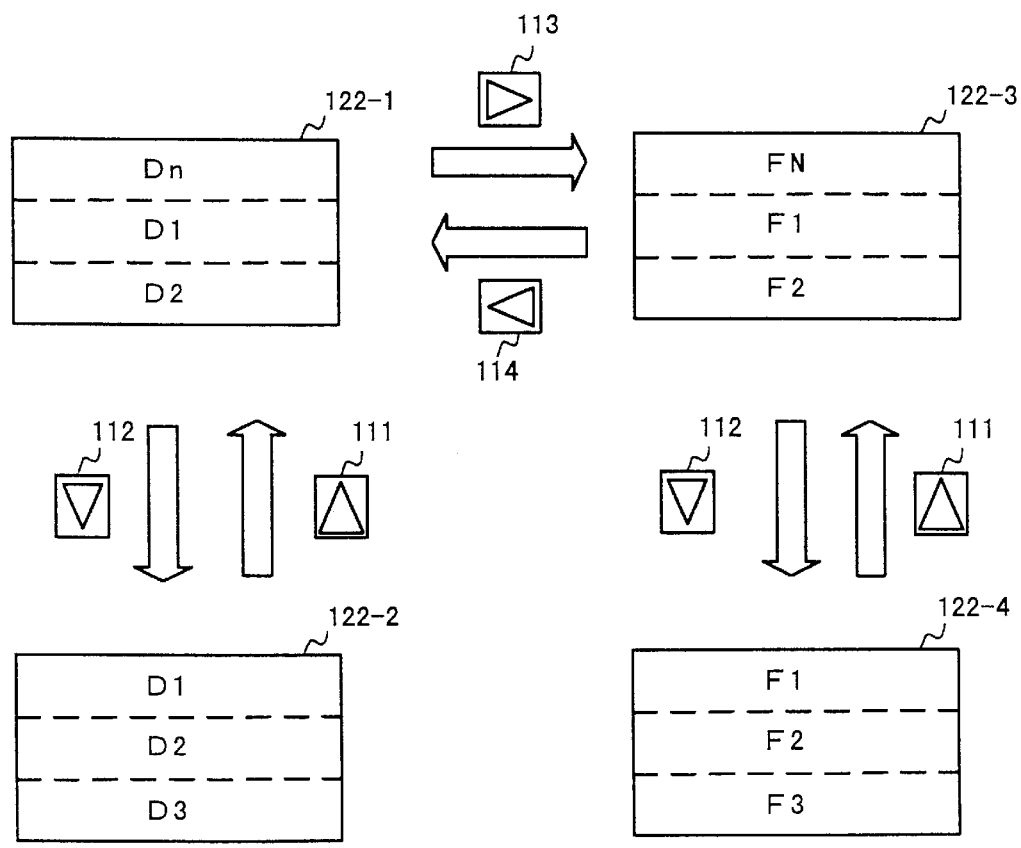
FIG. 14 is a drawing depicting the scrolling of data displayed on the display screen of the display section shown in FIG. 1 when the memory structure shown in FIG. 13 is used.

FIG. 14 is a drawing depicting the scrolling of data displayed at the center of the display area 120 on the display screen of the display section 12 shown in FIG. 1 when the scroll button, which is not illustrated, of the key input section 11 shown in FIG. 1 is pressed.

In FIG. 14, if the bottom scroll button 112 of the key input section 11 shown in FIG. 1 is pressed, in the initial state 122-1 where the data D1 is displayed at the center of the display area on the display screen of the display section 12 and the data Dn and D2 are displayed above and below the data D1, the display of the display area 120 on the display screen of the display section 12 shifts to the state 1122-2 where the data D2 is displayed at the center and the data D1 and D3 are displayed above and below the data D2.

If the right scroll button 113 of the key input section 11 shown in FIG. 1 is pressed in the above mentioned initial state 122-1, the display of the display area 120 shifts to the state 122-3 where the data F1 is displayed at the center and the data FN and F2 are displayed above and below the data F1.

If the bottom scroll button 112 is pressed again in this state, the display of the display area 120 on the display screen of the display section 12 shifts to the state 122-4 where the data F2 is displayed at the center and the data F1 and F3 are displayed above and below the data F2.

If the top scroll button 111 is pressed in the state 1222, the display of the display area 120 shifts to the initial state 122-1, and if the left scroll button 114 is pressed in the state 122-3, the display of the display area 120 shifts to the initial state 122-1, and if the top scroll button 111 is pressed in the state 122-4, the display of the display area 120 shifts to the state 122-3.

In this state too, if call operation is executed by pressing the call button, which is not illustrated, of the key input section 11 shown in FIG. 1, a destination party, corresponding to the data indicating a fixed destination party to be displayed at the center of the display area 120, can be called up.

If the data to be stored in the second memory area 130b is the data to be stored for implementing a conventional telephone directory function, call operation can be executed with superb operability by effectively using the destination party data stored by the conventional redial function and data stored by the telephone directory function.

In the configuration shown in FIG. 14, the communication terminal may be structured such that when the data of the first memory area 130a is displayed, pressing the right scroll button 113 shifts any state to the state 122-3, which is the initial screen of the fixed destination parties, and when the data of the second memory area 130b is displayed, pressing the left scroll button 114 shifts any state to the state 122-1, which is the initial screen of the destination parties where a call was placed or received in the past.

The above top scroll button 111, bottom scroll button 112, right scroll button 113 and left scroll button 114 may be a single multi-function key. In this case, this multi-function key is roughly a circular key, for example, structured such that four directions, top, bottom, left and right can be input, where pressing the top end corresponds to pressing the above mentioned top scroll button 111, pressing the bottom end corresponds to pressing the above mentioned bottom scroll button 112, pressing the right end corresponds to pressing the above mentioned right scroll button 113, and pressing the left end corresponds to pressing the above mentioned left scroll button 114.

FIG. 15 is a drawing showing an example of the data which is stored in the memory area 130 of the memory 13 of the communication terminal 20 when the above structure is used.

In the configuration shown in FIG. 15, the data D1–Dn indicating destination parties are stored in the addresses A11 and A1n of the memory area 130a of the memory 13 after arranging this data in a predetermined sequence (see FIG. 15(a). The data F1–Fn indicating destination parties are stored in the addresses A21 and A2n of the memory area 130b of the memory 13 after arranging this data in a predetermined sequence (see FIG. 15(b). The data R1–Rn indicating destination parties are stored in the addresses A31–A3n of the memory area 130c of the memory 13 after rearranging this data in a predetermined sequence (see FIG. 15(c).

Figures 16A, 16B, 16C:
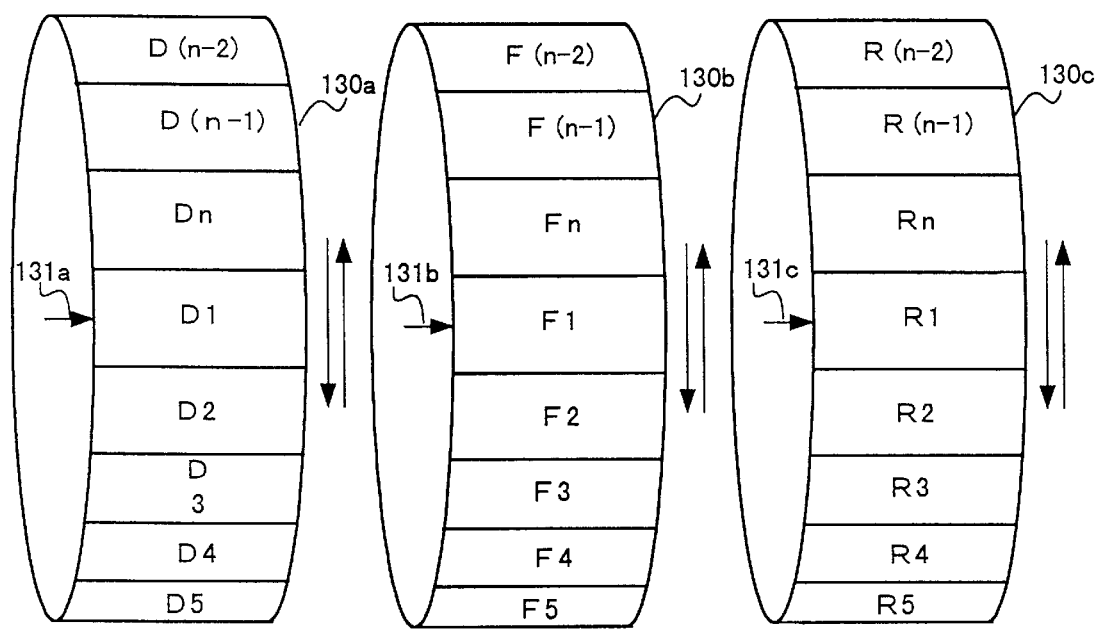
FIGS. 16(a) to 16(c) are drawings depicting the memory structure of the memory area shown in FIG. 15.

Here the first memory area 130*a*, the second memory area 130*b* and the memory area 130*c* are structured as link buffers, as shown in FIG. 16(*a*), (*b*) and (*c*), by logically linking the first address A11 and the last address A1n, the first address A21 and the last address A2n, and the last address A3n and the first address A31 by the pointer 131*a*, 131*b* and 131*c* respectively.

Figure 17:
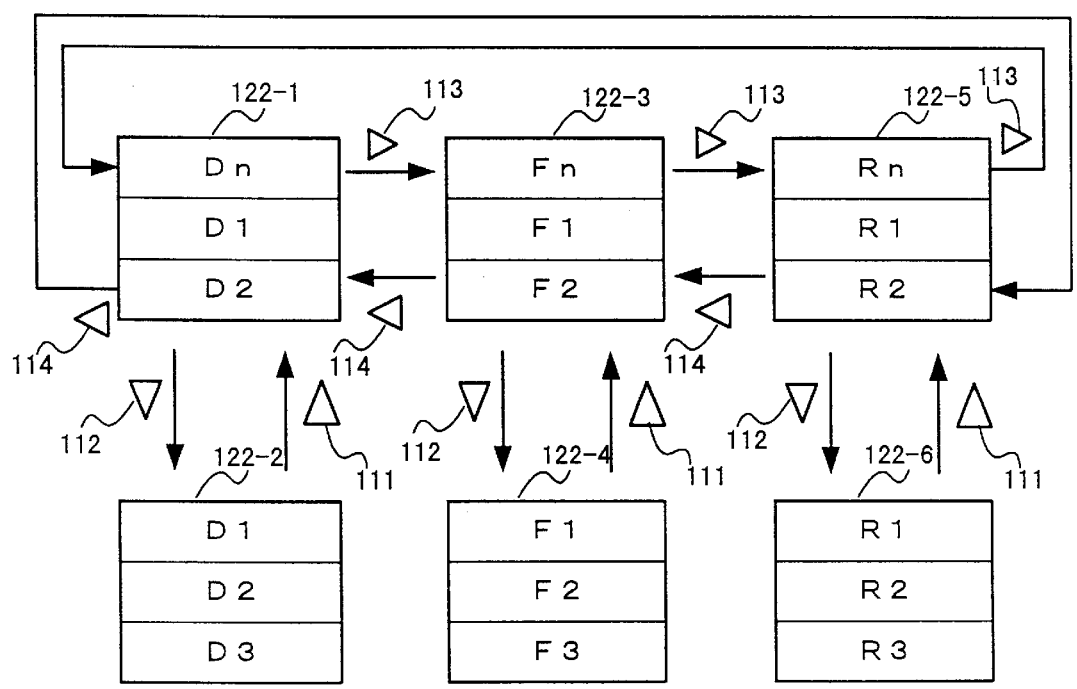
FIG. 17 is a drawing depicting the scrolling of data displayed on the display screen of the display section shown in FIG. 1 when the memory structure shown in FIG. 16 is used.

FIG. 17 is a drawing depicting the scrolling of data displayed at the center of the display area on the display screen of the display section 12 shown in FIG. 1 in the above case when the scroll buttons, which are not illustrated, of the key input section 11 shown in FIG. 1 are pressed.

In FIG. 17, if the bottom scroll button 112 of the key input section 11 shown in FIG. 1 is pressed in the initial state 122-1 where the data D1 is displayed at the center of the display area on the display screen of the display section 12 and the data Dn and D2 are displayed above and below the data D1, the display of the display area on the display screen of the display section 12 shifts to the state 122-2 where the data D2 is displayed at the center, and the data D1 and D3 are displayed above and below the data D2.

If the right scroll button 113 of the key input section 11 shown in FIG. 1 is pressed in the initial state 122-1, the display of the display area shifts to the state 122-3 where the data F1 is displayed at the center and the data Fn and F2 are displayed above and below the data F1.

If the bottom scroll button 112 is pressed in this state, the display of the display area on the display screen of the display section 12 shifts to the state 122-4 where the data F2 is displayed at the center and the data F1 and F3 are displayed above and below the data F2.

If the right scroll button 113 of the key input section 11 shown in FIG. 1 is pressed in the initial state 122-3, the display of the display area shifts to the state 122-5 where the data R1 is displayed at the center and the data Rn and R2 are displayed above and below the data R1.

If the bottom scroll button 112 is pressed in this state, the display of the display area on the display screen of the display section 12 shifts to the state 122-6 where the data R2 is displayed at the center and the data R1 and R3 are displayed above and below the data R2.

If the top scroll button 111 is pressed in the state 122-2, the display of the display area 120 shifts to the initial state 122-1, and if the top scroll button 111 is pressed in the state 122-4, the display of the display area 120 shifts to the initial state 122-3, and if the top scroll button 111 is pressed in the state 122-6, the display of the display area 120 shifts to the initial state 122-5.

If the right scroll button 113 is pressed in the state 122-5, the display of the display area 120 shifts to the initial state 122-1.

If the left scroll button 114 is pressed in the state 122-5, the display of the display area 120 shifts to the state 122-3, if the left scroll button 114 is pressed in the initial state 122-3, the display of the display area 120 shifts to the initial state 122-1, and if the left scroll button 114 is pressed again in the initial state 122-1, the display of the display area shifts to the state 122-5.

In this case as well, if call operation is executed by pressing the call button, which is not illustrated, of the key input section 11 shown in FIG. 1, a destination party, corresponding to the data indicates a fixed destination party to be displayed at the center of the display area 120, can be called up.

If the data to be stored in the second memory area 130*b* and the second memory area 130*c* are data to be stored to implement a conventional telephone directory function, such as for the telephone number of a destination party to which calls are frequently placed, the telephone number of an originator whose call arrived when the user was absent, the telephone number of a destination party from which a call is received, and the telephone number of a destination party to which a message is sent, then call operation can be executed with superb operability by linking the destination party data stored by the conventional redial function and data stored by the telephone directory function using the left and right scroll buttons.

If a four directional multi-function key, which has the top, bottom, left and right scroll functions, is used, the different types of operations for telephone numbers can be implemented by one key, which further improves operability.

INDUSTRIAL APPLICATION

The present invention improves operability of a communication terminal, such as a portable radio telephone. In accordance with the present invention, information on a destination party used for placing or receiving a call is stored, and erase inhibition is set for a part or all of the stored destination party information, so that destination party information which is frequently used is not erased, and as a result, a call to a destination party corresponding to the stored destination party information can be placed with easy operation.

Also in accordance with the present invention, the first destination party information indicating a specific destination party which is set in advance and the second destination party information which is obtained from an operation for a call placed or received in the past can be displayed on the display by scrolling, therefore operability to select a destination party to call according to the significance of the destination party can be considerably improved.

What is claimed is:

1. A communication terminal device, comprising:

a storage unit configured to store destination party information input for executing a communication operation;

a setting unit configured to set whether a stored sequence of the destination party information stored in the storage unit can be changed;

a changing unit configured to change, based on the setting in the setting unit, the stored sequence of the destination party information when destination party information is input for executing the communication operation;

a display unit configured to scrollably display a plurality of destination party information stored in the storage unit in accordance with the stored sequence changed by the changing unit; and a communication unit configured to execute communications with a destination party indicated by destination party information, in a state where the destination party information is displayed on the display unit.

2. The communication terminal device according to claim 1, wherein the setting unit comprises:

an erase inhibition setting unit configured to selectively set at least one specific destination party information among the destination party information stored in the storage unit for erase inhibition; and an erase inhibition cancellation setting unit configured to selectively cancel the erase inhibition of the at least one specific destination party information set for erase inhibition by the erase inhibition setting unit;

wherein the changing unit rearranges the stored sequence of the plurality of destination party information stored in the storage unit when storing in the storage unit the destination party information where a call was placed, received or input.

3. The communication terminal device according to claim 2, wherein the changing unit rearranges destination party information other than the at least one specific destination party information set for erase inhibition by the erase inhibition setting unit, based on a difference between a time when a call was placed and a current time.

4. The communication terminal device according to claim 2, wherein the changing unit rearranges destination party information other than the at least one specific destination party information set for erase inhibition by the erase inhibition setting unit, based on a difference between a time when a call was placed and a time when a call was received and a current time.

5. The communication terminal device according to claim 2, wherein the changing unit rearranges the destination party information in such a manner that, when the destination party information to which a call was placed or from which a call was received is already stored in the storage unit, this destination party information being shifted to an uppermost area excluding the destination party information set for erase inhibition by the erase inhibition setting unit and the other destination party information being sequentially shifted to lower areas, and when the destination party information to which a call was placed or from which a call was received is not stored in the storage unit, this destination party information being stored in the uppermost area excluding the destination party information set for erase inhibition by the erase inhibition setting unit and the other destination party information being sequentially shifted to the lower areas.

6. The communication terminal device according to claim 2, wherein the changing unit rearranges the destination party information in such a manner that, when the destination party information to which a call was placed or from which a call was received is already stored in the storage unit, this destination party information being shifted to an uppermost area and the other destination party information including the destination party information set for the erase inhibition by the erase inhibition setting unit being sequentially shifted to lower areas, and when the destination party information to which a call was placed or from which a call was received is not stored in the storage unit, this destination party information being stored in the uppermost area and the other destination party information including the destination party information set for the erase inhibition by the erase inhibition setting unit being sequentially shifted to the lower areas.

7. The communication terminal device according to claim 2, wherein
the storage unit comprises a ring buffer where the destination party information to which a call was placed or from which a call was received is rearranged in a sequence of newer calls placed or received and is stored from a first address, the destination party information set for erase inhibition by the erase inhibition setting unit being stored in a last address, and the first address and the last address being logically linked, and
the display control unit controls the display of the destination party information stored in the ring buffer in the stored sequence on the display in a manner as to be able to scroll in a ring-shape fashion in two opposite direction.

8. The communication terminal device according to claim 7, wherein the display control unit displays the destination party information stored in the first address of the storage unit on the display.

9. The communication terminal device according to claim 8, wherein the display control unit displays destination party information stored in an address adjacent to an address, where one destination party information is stored, on the display, along with this one destination party information.

10. The communication terminal device according to claim 1, wherein the storage unit comprises:
a first ring buffer where the destination party information set for erase inhibition by the erase inhibition setting unit is stored in a sequence of significance from a first address and the first address and a last address are logically linked, and
a second ring buffer where the destination party information to which a call was placed or from which a call was received is rearranged in a sequence of newer calls placed or received and is stored from the first address, and the first address and the last address are logically linked,
wherein the display control unit controls the display of the destination party information stored in the second ring buffer in the stored sequence in a manner as to be able to scroll in two opposite directions on the display, and at the same time, by switching the display of the destination party information stored in the second buffer ring, the display control unit controls the display of the destination party information stored in the first ring buffer in the stored sequence in a manner as to be able to scroll in two opposite directions on the display.

11. The communication terminal device according to claim 1, further comprising a telephone directory storage unit where telephone numbers and identification information for respective telephone numbers are stored, wherein the destination party information is identification information stored in the telephone directory storage unit.

12. A communication terminal device, comprising:
a counting unit configured to count a number of calls which were placed for destination party information;
a storage unit configured to store, in relation to the counted destination party information, the number of calls counted by the counting unit; and
a display control unit configured to scrollably display the destination party information stored in the storage unit on a display,
wherein the counting unit inhibits counting of subsequent calls when a plurality of calls are continuously placed for the same destination party information within a predetermined time.

13. A communication terminal device which executes a call operation in a state where destination party information is displayed on a display so that a call is placed to a destination party related to the destination party information displayed on the display, comprising:
a plurality of ring buffers where the destination party information is sequentially stored from a first address, and the first address and a last address are logically linked;
a first selection unit configured to select one of the plurality of ring buffers; and
a second selection unit configured to scroll the destination party information stored in a ring buffer selected by the first selection unit in two opposite directions on the display according to the stored sequence, so as to select desired destination party information stored in the selected ring buffer.

14. The communication terminal device according to claim 13, wherein the first selection unit is implemented by a horizontal scrolling function and the second selection unit is implemented by a vertical scrolling function.

15. The communication terminal device according to claim 14, wherein the horizontal scrolling function and the vertical scrolling function are implemented by a single key which has a four-directional control function.

16. The communication terminal device according to claim 13, wherein the destination party information stored in one of the plurality of ring buffers includes destination party information on destination parties where a call was placed or received in the past.

17. The communication terminal device according to claim 13, wherein the destination party information stored in one the plurality of ring buffers includes destination party information on an originator who placed a call that was not received and responded to.

18. The communication terminal device according to claim 13, wherein the destination party information stored in one the plurality of ring buffers includes destination party information which is set by an operator.

19. The communication terminal device according to claim 13, further comprising a telephone directory storage unit where telephone numbers and identification information for respective telephone numbers are stored, wherein the destination party information is identification information stored in the telephone directory storage unit.

* * * * *

UNITED STATES PATENT AND TRADEMARK OFFICE
CERTIFICATE OF CORRECTION

PATENT NO.    : 6,643,370 B1
DATED         : November 4, 2003
INVENTOR(S)   : Takeshi Kurihara et al.

It is certified that error appears in the above-identified patent and that said Letters Patent is hereby corrected as shown below:

<u>Title page,</u>
Item [30], Foreign Application Priority Data, "8-174862" has been replaced with -- 10-174862 --.

Signed and Sealed this

Twenty-seventh Day of April, 2004

JON W. DUDAS
*Acting Director of the United States Patent and Trademark Office*